(12) United States Patent
Horie et al.

(10) Patent No.: US 6,586,871 B1
(45) Date of Patent: Jul. 1, 2003

(54) CRT PANEL GLASS AND PRODUCTION METHOD THEREOF AND CRT

(75) Inventors: Noritoshi Horie, Funabashi (JP); Tsunehiko Sugawara, Funabashi (JP); Takuji Oyama, Yokohama (JP)

(73) Assignee: Asahi Glass Company, Limited, Tokyo (JP)

(*) Notice: Subject to any disclaimer, the term of this patent is extended or adjusted under 35 U.S.C. 154(b) by 0 days.

(21) Appl. No.: 09/869,329

(22) PCT Filed: Jan. 24, 2000

(86) PCT No.: PCT/JP00/00322
§ 371 (c)(1), (2), (4) Date: Jul. 25, 2001

(87) PCT Pub. No.: WO00/44029
PCT Pub. Date: Jul. 27, 2000

(30) Foreign Application Priority Data

Jan. 25, 1999 (JP) ............................................. 11-016284

(51) Int. Cl.⁷ ............................ H01J 29/06; H01J 29/88
(52) U.S. Cl. ..................... 313/461; 313/479; 313/478; 313/477 R
(58) Field of Search ................................. 313/407, 408, 313/461, 477 R, 478, 479

(56) References Cited

U.S. PATENT DOCUMENTS 6,268,693 B1 * 7/2001 Miwa et al. ................. 313/479

FOREIGN PATENT DOCUMENTS

| EP | 0 859 398 | 8/1998 |
| JP | 61-185852 | 8/1986 |
| JP | 62-118302 | 5/1987 |
| JP | 5-182604 | 7/1993 |
| JP | 6-308614 | 11/1994 |
| JP | 10-177850 | 6/1998 |
| JP | 11-233050 | 8/1999 |
| JP | 11-283529 | 10/1999 |
| JP | 11-283530 | 10/1999 |
| JP | 11-307016 | 11/1999 |
| WO | WO 96/18917 | 6/1996 |

* cited by examiner

Primary Examiner—Vip Patel
Assistant Examiner—Joseph Williams
(74) Attorney, Agent, or Firm—Oblon, Spivak, McClelland, Maier & Neustadt, P.C.

(57) ABSTRACT

A panel glass having a surface treating film formed on a substrate glass so that an overall transmittance distribution within an effective picture plane satisfies a specific mathematical expression, whereby, even with a flattened panel glass, a uniform-brightness image can be observed with a good contrast, and occurrence of a double image is suppressed.

14 Claims, 2 Drawing Sheets

CRT PANEL GLASS AND PRODUCTION METHOD THEREOF AND CRT

TECHNICAL FIELD

The present invention relates to a CRT panel glass (hereinafter also referred to simply as a panel glass) having the contrast and uniformity in brightness improved and having occurrence of a double image suppressed, and a CRT provided with such a panel glass and being excellent in the above characteristics.

BACKGROUND ART

A panel glass for CRT is required to present a uniform brightness of an image displayed in the picture plane.

As a method to display an image brightness uniformly, a method wherein the transmittance of the panel glass is made constant in the plane, or a method wherein, while a transmittance distribution is permitted to be present in the panel glass, it is corrected by an intensity distribution of an electron beam, and a distribution is imparted to the emission intensity of the phosphor, may be mentioned.

However, the latter method has a technical limit such that when a panel glass has a large transmittance distribution, such as a transmittance distribution of at least 10%, it cannot cope therewith.

On the other hand, as a conventional method wherein the transmittance of a panel glass is made constant, the glass base material is made to be transparent to eliminate the difference in the transmittance due to the thickness of the glass. However, this method cannot cope with flattening of recent panel glasses where the difference in thickness between the center portion and the peripheral portion is large, and it is difficult to make the transmittance of such panel glasses to be uniform. Further, it has been attempted to solve the above problems by increasing the transmittance of the glass base material as a panel glass provided with an antireflection film and by reducing the transmittance of the antireflection film, but there has been a problem that the internal reflection tends to be high, and a double image is likely to form. Consequently, in a case of a flattened panel glass, there have been problems such that the contrast is poor, and a double image forms, in addition to a problem that uniformity cannot be attained in the brightness of images.

Further, as another related technology, JP-A-61-185852 discloses a method wherein the total glass thickness within the display area is made constant by attaching a front panel made of glass and provided with a thickness variation on the front surface of the panel glass by a resin. However, this method has had a problem that the weight of CRT increases, or the cost increases due to the bonding of the front panel.

Further, JP-A-6-308614 discloses a projection type display wherein, in order to improve the contrast, the projection screen is made to be a colored screen having an outer light absorption characteristic on its surface, and the color density is continuously changed from the center towards the periphery, so that the brightness distribution of the screen will be uniform, as seen by an observer. This publication also discloses that a similar effect can be obtained also by providing a distribution to the thickness of the colored screen. These methods are considered to be effective as means to make the brightness over the entire surface of the display uniform by intentionally providing a transmittance distribution to the display. However, in a case where such methods are applied to a panel glass for CRT, it will be required to have a resin film or a front panel corresponding to the colored screen, thus leading to a problem of the weight increase or the increase of the costs, as in the case described above.

Further, JP-A-10-177850 discloses a method for making the transmittance of the center portion and the peripheral portion uniform by bonding a resin film on the front surface of a panel glass for CRT and by adopting any one of ① coloring the resin film, ② applying a colored coating on the resin film surface and ③ coloring the adhesive used for bonding the resin film to the panel glass. However, this method also has had a problem of the weight increase or the increase of the costs.

The object of the present invention is to provide a panel glass whereby a uniform brightness image can be observed with a good contrast, even with a flattened panel glass whereby the difference in brightness between the center portion and the peripheral portion becomes distinct especially when a colored glass is employed.

The present invention further has an object to provide a method for producing a panel glass, whereby the above-mentioned panel glass can be obtained in a simple method at a low cost.

The present invention further has an object to provide a panel glass having also an electromagnetic wave shielding performance and a method for its production.

The present invention further has an object to provide a panel glass having also a low reflection performance and a method for its production.

Further, the present invention has an object to provide a panel glass having occurrence of a double image suppressed and a method for its production.

Another object of the present invention is to provide a CRT provided with a panel glass having the above-mentioned excellent characteristics.

DISCLOSURE OF THE INVENTION

According to the present invention, panel glasses of the following 1) to 20), a method for producing a panel glass of 21), and a CRT of 22) are provided, whereby the above-mentioned objects of the present invention are accomplished.

1) A panel glass having a surface treating film formed on an outer surface of a substrate glass, characterized in that the surface treating film is formed on the outer surface so that the value A defined by the following mathematical expression (1) is less than 1 within an effective picture plane:

$$Value\ A = \left| \frac{1 - \frac{Tgf(min)}{Tgf(max)}}{1 - \frac{Tg(min)}{Tg(max)}} \right| \quad \text{Mathematical expression (1)}$$

In the mathematical expression (1):
Tg(min) and Tg(max) represent the minimum transmittance (%) and the maximum transmittance (%) of the substrate glass itself, respectively; and
Tgf(max) and Tgf(min) represent the maximum transmittance (%) and the minimum transmittance (%) of an integral body comprising the substrate glass and the surface treating film.

2) The panel glass according to 1), characterized in that the value A is at most 0.85.

3) The panel glass according to 1) or 2), characterized in that the value A is at most 0.7.

4) The panel glass according to any one of 1) to 3), characterized in that the difference between the minimum transmittance Tf(min) of the surface treating film and the maximum transmittance Tf(max) of the surface treating film is within a range of from 2 to 20%.

5) The panel glass according to any one of 1) to 4), characterized in that the difference between Tf(min) and Tf(max) is within a range of from 3 to 10%.

6) The panel glass according to any one of 1) to 5), characterized in that Tgf(min)/Tgf(max) is at least 0.8.

7) The panel glass according to any one of 1) to 6), characterized in that Tgf(min)/Tgf(max) is at least 0.9.

8) The panel glass according to any one of 1) to 7), characterized in that Tgf(min)/Tgf(max) is at least 0.95.

9) The panel glass according to any one of 1) to 8), characterized in that the surface treating film is an antireflection film against outer light.

10) The panel glass according to any one of 1) to 9), characterized in that the surface treating film is a light absorptive film.

11) The panel glass according to any one of 1) to 10), characterized in that at least one layer among layers constituting the surface treating film is a conductive film.

12) The panel glass according to any one of 1) to 11), characterized in that the change in the thickness of the substrate glass is distributed mainly in the long axial direction of the panel glass.

13) The panel glass according to any one of 1) to 12), characterized in that the change in the thickness of the substrate glass is distributed mainly in a short axial direction of the panel glass.

14) The panel glass according to any one of 1) to 13), characterized in that Tg(max) is within a range of from 30 to 70%.

15) The panel glass according to any one of 1) to 14), characterized in that the reflectance as observed from inside of the substrate glass, is at most 15%.

16) The panel glass according to any one of 1) to 15), characterized in that the surface treating film is a film having a construction such that a light absorptive layer containing titanium nitride as the main component and a layer containing silica as the main component, are formed in this order on the substrate glass.

17) The panel glass according to 16), characterized in that the light absorptive layer containing titanium nitride as the main component, has a thickness distribution.

18) The panel glass according to 17), characterized in that the layer containing silica as the main component has a thickness distribution diverse to the light absorptive layer containing titanium nitride as the main component.

19) The panel glass according to any one of 1) to 18), wherein Tgf(max) is within a range of from 30 to 70%.

20) The panel glass according to any one of 1) to 9), characterized in that the transmittance Tf at an optional position of the surface treating film is within range of from 40 to 90%.

21) The panel glass according to any one of 1) to 20), characterized in that Tf is within a range of from 60 to 90%.

22) The panel glass according to any one of 1) to 21), characterized in that the outer diameter of the panel glass (the average radius of curvature of the outer surface of the panel glass) is at least 5 times the value R calculated by the following mathematical expression (2):

$$\text{Value R (unit: mm)} = \text{Screen diagonal length (inch)} \times 42.5 + 45.0 \quad \text{Mathematical expression} \quad (2)$$

(provided that the screen diagonal length is the effective picture plane size (inch) of the display.)

23) A method for producing a panel glass characterized in that a surface treating film is formed on an outer surface of a substrate glass, characterized in that the surface treating film is formed on the outer surface so that the value A defined by the mathematical expression (1) is less than 1 within an effective picture plane.

24) A CRT having the panel glass as defined in any one of 1) to 22).

BEST MODE FOR CARRYING OUT THE INVENTION

Figure 1:
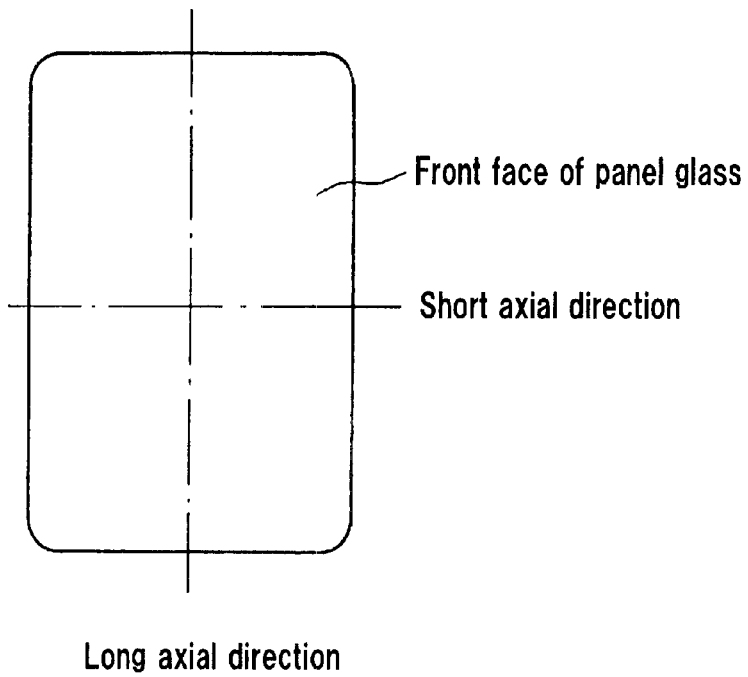
FIG. 1 is a front view of a panel glass.

The panel glass of the present invention has a surface treating film formed on a substrate glass (hereinafter also referred to simply as a glass). The surface treating film may preferably have e.g. the following constructions.

i) a construction in which a light-absorbing film and a low refractive index film are formed in this order on a substrate glass.

ii) a construction wherein a light-absorbing film, an oxidation barrier film and a low refractive index film are formed in this order on the substrate glass.

For the above light-absorbing film, it is preferred to employ a material which substantially reduces the surface reflectance to outer light by a light interference effect with the low refractive index layer formed thereon, whereby the contrast of an image on the panel glass will be excellent.

Further, the light-absorbing film is preferably electrically conductive. Due to the electrical conductivity, an antistatic effect of CRT or prevention of leakage of electromagnetic waves from the interior of CRT can be attained, such being desirable.

As a light-absorbing film to satisfy such characteristic, one containing at least one metal selected from the group consisting of gold, copper, titanium, zirconium and hafnium, or a nitride of such a metal, as the main component, may, for example, be mentioned.

Among them, one containing a nitride of at least one metal selected from the group consisting of titanium, zirconium and hafnium, as the main component, is preferred from the viewpoint of the refractive index in a visible light region and from the dispersion relation of an attenuation coefficient, and it has a characteristic that the low reflection region in the visible light range (against light (outer light) from the film side) will be broadened by the light interference action with the low refractive index film as an upper layer, depending upon the value of its optical constant. Further, the film containing, as the main component, a nitride of at least one metal selected from the group consisting of titanium, zirconium and hafnium, is preferred also from the viewpoint of the heat resistance, the chemical resistance or the abrasion resistance.

In a case where two or more materials are used for the light-absorbing film, (1) they may be employed as a composite material, or (2) films made of different materials may be laminated so that the total film thickness (the geometrical film thickness, the same applies hereinafter) will preferably be from 5 to 25 nm.

Further, a light-absorbing film containing titanium nitride as the main component, is particularly preferred also from the viewpoint of the productivity and from the viewpoint of the reproducibility, since the value of its optical constant in a visible light region matches well with the silica film to reduce the reflectance, and the value of the absorption coefficient is proper, and the film thickness to obtain a proper light absorbance will be within the range of from a few nm to a few tens nm.

Further, as the low refractive index film, a film having a refractive index of from 1.35 to 1.7, is preferred. As the low refractive index film, a film containing silica as the main component (a silica film) is preferred. The refractive index of the silica film is preferably from 1.46 to 1.52 (particularly preferably from 1.46 to 1.47). The thickness of the silica film is preferably from 70 to 130 nm, whereby the low reflection wavelength region can be adjusted to the center portion of the visible light region. Also from the viewpoint of the mechanical and chemical durability, the silica film is preferably employed.

The thickness of the silica film is particularly preferably more than 80 nm and at most 120 nm. If the thickness of silica is less than 80 nm, the reflectance on a long wavelength side tends to be large, and if it exceeds 120 nm, the rising of the reflectance on the short wavelength side tends to shift towards the long wavelength side.

It may happen that the desired properties cannot be obtained for a reason such that at the time of forming a silica film as a low refractive index film after forming the light-absorbing film on the substrate glass, the light absorbing film undergoes oxidation, or the light absorbing film undergoes oxidation in the heat treatment after the film forming.

Accordingly, a layer to prevent oxidation of the light-absorbing film (hereinafter referred to as an oxidation barrier layer) may be inserted between the light-absorbing film and the silica film, whereby oxidation during the film forming can be prevented, and the heat resistance can be improved.

An oxidation barrier layer of this type is commonly used in so-called Low-E glass employing a silver film. For example, U.S. Pat. No. 4,548,691 and JP-A-59-165001 disclose a barrier layer formed for the purpose of preventing oxidation of a silver film during the film formation of an oxide film to be formed on the silver film. Thus, this barrier layer is a thin film formed to prevent oxidation of another layer formed therebeneath and accordingly has optically no significance.

As such an oxidation barrier layer, various metal films or metal nitride films may be employed. The film thickness is preferably at most 20 nm not to impair the inherent antireflection performance. Further, if the thickness of this oxidation barrier layer is less than 1 nm, improvement of the heat resistance tends to be inadequate. Accordingly, it is preferred to insert an oxidation barrier layer having a film thickness of from 1 to 20 nm, whereby the heat resistance can effectively be improved.

As described above, this oxidation barrier layer has optically no significance and is a layer which is not required optically. Accordingly, it may happen that by the insertion of this layer, the antireflection performance against outer light deteriorates. Especially when the oxidation barrier layer is light absorptive (such as light-absorptive silicon), the thickness of the oxidation barrier layer is preferably at most about 5 nm from the viewpoint of the antireflection performance.

In a case where a transparent oxidation barrier layer is employed, the allowable film thickness varies depending upon the refractive index of this layer. When a material having a refractive index of about 2.0 (such as silicon nitride or aluminum nitride) is employed, the allowable film thickness becomes maximum, and a barrier layer of up to 20 nm may be inserted between the light-absorbing film as a lower layer and the silica film layer as an upper layer, while maintaining the low reflection characteristic against outer light.

As the oxidation barrier layer, it is preferred to employ a film containing, as the main component, at least one metal selected from the group consisting of chromium, molybdenum, tungsten, vanadium, niobium, tantalum, zinc, nickel, palladium, platinum, aluminum, indium, tin and silicon or a film containing a nitride thereof as the main component, or a film containing, as the main component, at least one metal selected from the group consisting of titanium, zirconium and hafnium, whereby adequate improvement of the oxidation-preventing performance and maintenance of the excellent antireflection characteristic, can both be attained.

Especially, a film containing silicon as the main component or a film containing silicon nitride as the main component, is excellent in the oxidation barrier performance, and it is advantageous from the viewpoint of the production in that it is not required to increase the target material when the upper layer silica film is formed by sputtering by means of a conductive Si target.

As a means to form the surface treating film (the light-absorbing film, the low refractive index film or the oxidation barrier film) on a glass panel, a sputtering method, an ion plating method, a vacuum vapor deposition method or a CVD method may, for example, be employed. Among them, a sputtering method or a vacuum vapor deposition method is preferred, since the film thickness distribution can easily be corrected, and film formation over a large area is easy. It is particularly preferred to employ an inline type sputtering method excellent in the productivity, since a good film quality, and uniformity of the film quality can easily be attained. Further, from the viewpoint of the productivity, a DC (direct current) magnetron type sputtering method is preferred, whereby modification of the apparatus to a large size is easy.

As a film forming technique for the surface treating film, a film forming technique by a sol/gel method employing ultra-fine particles of a metal, may be mentioned in addition to those mentioned above, but by this method, it is practically difficult to uniformly form a film. Further, with a film forming method employing ultra-fine particles of a nitride, it is necessary to increase the film thickness as compared with a sputtering method, and it cannot be regarded as a preferred method from the viewpoint of the cost, the productivity and the performance. A nitride film (a light-absorbing film) formed by a sputtering method shows good heat resistance even with a thin film.

In a case where one containing a metal nitride as the main component, is used as a light-absorbing film, if a film containing a nitride as the main component is used as the oxidation barrier layer, the light-absorbing film and the oxidation barrier layer can be formed by sputtering in the same gas atmosphere. This is a substantial merit, when a film forming installation for practical sputtering is considered.

Namely, when a so-called inline type sputtering apparatus excellent in the mass production is taken into consideration, such a light-absorbing film and an oxidation barrier layer can be formed within the same chamber (hereinafter referred to as chamber A). Accordingly, a chamber for gas separation may be formed only between chamber A and a chamber for forming a silica film to be formed as an upper layer, such being very efficient.

Especially when a film containing titanium nitride as the main component is used as a light-absorbing film, and silicon nitride is used as an oxidation barrier layer, an effect of improving the adhesive strength of the silica film as the outermost layer with the titanium nitride film, will also be obtained.

In the panel glass of the present invention, the surface treating film is formed on the glass, so that the value A defined by the above expression (1) is less than 1, preferably at most 0.85, more preferably at most 0.7, as the overall transmittance distribution within the effective picture plane.

Here, the effective picture plane is defined in accordance with the provisions of the standards by Electronics Industries Association of Japan EIAJ ED-2136A (the effective dimensions and effective areas of CRT glass valves).

Further, Tg represents the transmittance of the substrate glass, and Tg(max) and Tg(min) represent the maximum transmittance and the minimum transmittance of the substrate glass itself, respectively.

Tgf(max) and Tgf(min) represent the maximum transmittance and the minimum transmittance of an integral body comprising the substrate glass and the surface treating film, respectively. In other words, they represent the maximum value of the overall transmittance including the substrate glass and the surface treating film.

Further, these are values within the effective, picture plane of the panel glass.

The value A defined by the above expression (1) is an index for the transmittance distribution of the panel glass (the ratio of the difference in transmittance between the panel center and the periphery of the panel having the surface treatment applied, to the difference in transmittance between the center and the periphery of the substrate glass itself). The smaller this value, the higher the improvement in the transmittance distribution of the panel glass of the present invention by the coating.

In order to let the value A satisfy the above value, a surface treating film is formed to have a transmittance distribution reverse to the transmittance distribution of the substrate glass. For example, in a case where film forming is carried out by sputtering, a film having a transmittance difference reverse to the transmittance difference between the center and the periphery of the substrate glass, is formed by providing a film thickness-correcting plate (so-called a mask or a baffle plate) which corrects the thickness distribution of the surface treating film.

Correction of the film thickness distribution can easily be carried out particularly by an inline type sputtering apparatus, and also from this viewpoint, it is preferred to employ a sputtering method. In the in-line type sputtering apparatus, a mask for correcting the film thickness distribution (the film thickness-correcting plate) may be installed in a direction perpendicular to the advancing direction of the substrate glass. It is not impossible to correct the film thickness distribution in the same manner by a vacuum vapor deposition method or a CVD method, but the film quality of the light-absorbing film is likely to be non-uniform. By the sputtering method, the film thickness distribution along the long axis (or along the short axis) of the panel glass can be intentionally formed by this method, whereby the in-plane distribution of the overall transmittance can be minimized.

On the other hand, by this method only, it is not possible to form a film thickness distribution intentionally in the advancing direction of the panel glass, but by its combination with other method, the film thickness distribution can be formed two dimensionally. For example, ① a method of obtaining a film thickness distribution in a back-and-forth direction (in the advancing direction) by interlocking the advancing position of the panel glass and the electric power applied to the target, or ② a method of obtaining a film thickness distribution in the back-and-forth direction (in the advancing direction) by fixing a mask having a shape similar to a punching metal (or a honeycomb) to a substrate carrier and changing the numerical aperture as between back and forth, may be considered. In the case of the method of ②, it is necessary to take the distance between the mask and the substrate long so that the mask shape will be reflected to the film thickness on the substrate in a sufficiently blurred shape.

Further, ③ it is possible to let the substrate side of mask have a two dimensional distribution and to form a film thickness distribution over the entire substrate surface by this method only. However, in the case of the method of ③, there will be a difficulty in a case where, as described hereinafter, it is desired to provide different film thickness distributions among the respective layers of a multi-layer film.

For the purpose of providing a two dimensional film thickness distribution to the surface treating film on the panel glass, it is particularly preferred to employ a method of providing a film thickness distribution by employing a combination of a mask for correcting the film thickness distribution in a width direction attached to a cathode side and a (punching metal) mask for correcting the film thickness distribution in the advancing direction attached to the substrate side. The method for providing a two dimensional film-thickness distribution to the surface treating film on the panel glass, is effective particularly in a case where the glass thickness of the panel glass has a two dimensional distribution.

In a case where the glass thickness of the panel glass has one-dimensional distribution (for example, a cylindrical type panel glass, specifically, "Trinitron Tube", manufactured by Sony Corporation, etc.), one-dimensional film thickness distribution can be provided to the surface treating film solely by the above-mentioned mask for the cathode side. In such a case, if a film thickness distribution is provided to the film thickness in the long axial direction, the film thickness in the short axial direction will be substantially constant.

Figure 2:
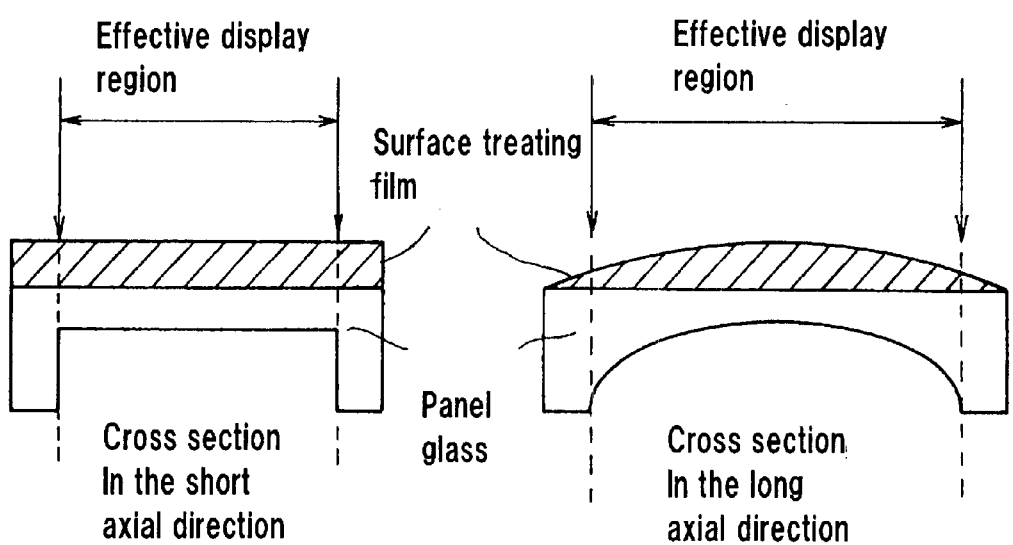
FIG. 2 is a cross-sectional view of a panel glass provided with a surface treating film in a case where the difference in the glass thickness is present only in the long axial direction.

FIG. 1 shows a front view of a panel glass. If one-dimensional film thickness distribution is provided to the surface treating film solely by the mask on the cathode side along the short axial direction of the panel glass as the advancing direction during the film forming, as shown in FIG. 2 (an example of a panel glass wherein the outer surface is flat), a film thickness distribution is provided in the long axial direction, while the film thickness will be substantially constant in the short axial direction. Namely, the film thickness distribution will be a "hog-backed shape" (in a case where Tg at the center portion>Tg at the end portion), and the film thickness distribution on a short side will be substantially the same as on the short axis.

In the present invention, for the purpose of accomplishing the object of the present invention, it is effective to provide a film thickness distribution to the film thickness of the light-absorbing film. In such a case, the film thickness distribution is preferably made to be a "hog-backed shape". Namely, when an electrode is provided at a peripheral portion (a short side portion), the thickness of the light-absorbing film (the conductive film) at the peripheral portion (the short side portion) is not thin, whereby a low resistance required for electromagnetic wave shielding, can be maintained. The surface resistance of the film at the portion where the electrode is provided, is preferably at most 1 kΩ/□.

Figure 3:
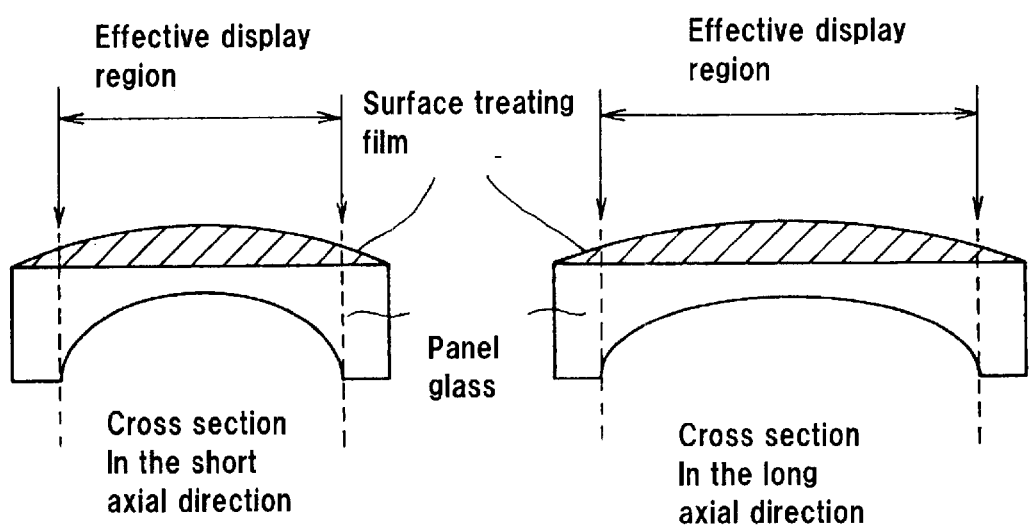
FIG. 3 is a cross-sectional view of a panel glass provided with a surface treating film in a case where the difference in the glass thickness is present in both the short and long axial directions.

FIG. 3 (an example of a panel glass wherein the outer surface is flat) shows a case wherein the film thickness distribution is provided over the entire surface "convex lens shape". In the case of the "convex lens shape" as shown in FIG. 3, the film thickness of the light-absorbing film (the conductive film) at the peripheral portion will be thin, whereby the resistance will be high, such being undesirable from the viewpoint of the electromagnetic wave shielding.

In order to further improve the uniformity of the overall transmittance within the effective display picture plane while maintaining the antireflection effect, the difference between the minimum transmittance Tf(min) of the surface treating film and the maximum transmittance Tf(max) of the surface treating film, is preferably within a range of from 2 to 20%, more preferably within a range of from 3 to 10%. Further, the transmittance of the surface treating film is the transmittance of the above-mentioned entire layer structure constituting the surface treating film.

Further, when Tgf(min)/Tgf(max) is preferably at least 0.8, more preferably at least 0.9, the display brightness within the picture plane will be uniform.

With a view to eliminating occurrence of a double image of the panel glass, Tg(max) is preferably at most 70%, particularly preferably from 30 to 70%, In a case where Tg(max) is less than 30%, Tf is required to be large to bring the overall transmittance to a practical value, and the conductive surface treating film (particularly the conductive light-absorbing film) is made to be thin, such being undesirable from the viewpoint of the electrical conductivity. On the other hand, if it exceeds 70%, it will be necessary to make the light absorbing film thick, whereby occurrence of a double image due to reflection from the glass/film interface (as viewed from the glass side), will be problematic. For the same reason, a more preferred range is from 35 to 65%, particularly preferably within a range of from 35 to 60%. In such a case, Tgf is preferably adjusted to be from 25 to 50%, from the viewpoint of the brightness and contrast.

Especially when an antireflection film having a simple structure comprising a light absorbing layer and (in some cases an oxidation barrier layer and) a low refractive index layer, is employed, by adjusting Tf to a level of from 60 to 90% (Particularly, from 60 to 85%) the overall transmittance Tgf can be made to be a proper value, and the internal reflectance as described hereinafter, can be made to be low, and at the same time, it is possible to attain elimination of occurrence of a double image and improvement of the contrast. The reflectance (the internal reflectance) as observed from the inside of the substrate glass, is preferably at most 15%, such being effective for elimination of occurrence of a double image. It is particularly preferred to make the internal transmittance to a level of at most 10%. Further, this reflectance is an overall reflectance attributable to the reflection from the interface between the surface treating film and the substrate glass, and the reflection from the interface between the substrate glass and the front air.

To adjust the above reflectance within the above range, it is preferred to provide, as the surface treating film, a layer containing titanium nitride as the main component, and further a layer containing silicon oxide as the main component, as a low refractive index film above the light-absorbing film. Further, it is preferred to provide an oxidation barrier layer between the light-absorbing film and the low refractive index film.

Further, with this film construction, it is preferred to provide a film thickness distribution to the low refractive index layer (in some cases, also to the oxidation barrier layer) in order to maintain the optical characteristics, particularly the low reflection performance to outer light in the visible region. In this case, the low refractive index layer preferably has a film thickness distribution reverse to the light-absorbing layer. This is effective to return to the initial state the spectral reflection spectrum shifted towards the short wavelength side as the light-absorbing film is thin at the peripheral portion, by increasing the film thickness of the upper layer. It is easily accomplished by an inline type sputtering method to let the lower layer and the upper layer have reversed film thickness distributions. Namely, in the film forming space for each target, a mask may be installed to provide the respective specific film thickness distribution. To provide reverse film thickness distributions to the upper layer and the lower layer (the light absorbing film) is effective for in-plane uniformity of the reflection color or in-plane uniformity of the transmittance distribution.

The layer containing titanium nitride as the main component as the above light-absorbing film, preferably contains oxygen, and when this layer is represented by $TiN_xO_y$, x in $TiN_xO_y$ is a number of from 0.5 to 1.5, preferably from 0.8 to 1.1, and y is a number of from 0 to 0.5, preferably from 0.03 to 0.4.

Further, Tgf(max) is preferably within a range of from 30 to 70%, particularly from 35 to 65%. The transmittance Tf at an optional position of the surface treating film is preferably within a range of from 40 to 90%, particularly from 60 to 90%. Here, Tf is a value defined by Tgf/Tg. With an antireflection film having the above-mentioned construction (i) or (ii), in order to make the in-plane reflectance to be at most 15%, the thickness of the light absorbing film as the first layer is required to be made at most 300 Å (since the reflection at the glass/antireflection film interface increases as the film thickness increases), and Tf at that time becomes substantially at least 60%. On the other hand, in order to make the surface resistance to be at most 1 kΩ/□ while maintaining the low reflection property on the film surface side, the thickness of the light absorbing film as the first layer is required to be at least 50 Å, and Tf at that time will be substantially at most 90%. Tf is particularly preferably from 60 to 85%.

The panel glass of the present invention is suitably employed as a flattened panel glass wherein the outer diameter of the panel is at least 5 times the value R calculated by the following mathematical expression (2):

Value R (unit: mm)=Screen diagonal length (inch)×42.5+45.0
 Mathematical expression (2)

The panel glass of the present invention, even if it is a flattened panel glass, has the range of the value A of the above expression (1), the difference between the minimum transmittance Tf(min) and the maximum transmittance Tf(max) of the surface treating film, the ratio of Tgf(min)/Tgf(max), the range of the value Tg(max), the range of the value Tgf(max), etc., specified as described above, whereby the transmittance of the panel glass is corrected, and the uniformity of the transmittance is accomplished.

The panel glass of the present invention can be prepared by forming the respective layers on the substrate glass by a method known per se. For example, the panel glass can be prepared by forming a light absorbing film, a protective film, an antioxidation film, an interlayer, etc. on a substrate glass by e.g. a sputtering method, a vacuum vapor deposition method, a CVD method or a sol gel method as disclosed in paragraph [0059] et seq in JP-A-9-156964.

The panel glass of the present invention can be applied to a CRT. With a CRT provided with the panel glass of the present invention, an image of uniform brightness can be viewed with a good contrast, and there will be substantially no occurrence of a double image.

EXAMPLES

Now, the present invention will be described in detail with reference to Examples. However, the scope of the present invention is not restricted by the Examples.

In the following Examples, the transmittance was measured by the following method.

By a transmittance meter corrected so that the transmittance by air will be 100%, Tg and Tgf were measured, and Tf was obtained as a measured numerical value based on the calculation of Tgf/Tg.

Example 1
(Preparation of Panel Glass)

A substrate glass (a panel glass, of which the inner surface has a curvature only in the long axial direction) having a cylindrical shape and made of a green glass (a tint green glass) of glass code H5702 as stipulated by EIAJ, was designed so that in the long axial direction of the panel glass, the center portion had a transmittance of 48%, and the peripheral portion had a transmittance of 40%. (Heretofore, it was impossible to circuitwise unify this 8% difference in the transmittance between the center and the peripheral portion).

As the substrate glass in Example 1, a flat panel of 19 inch was used. The outer diameter of the panel glass was 4,300 mm. In this case, R=850.

By a sputtering method, a light-absorbing conductive antireflection film was formed by correcting the film thickness distribution so that the difference in transmittance between the center portion and the peripheral portion of the panel would diminish. The antireflection film was one having a titanium nitride film (a light absorbing film), a silicon nitride film (an oxidation barrier layer) and a silica film (a low refractive index film) sequentially formed from the substrate glass side. Correction of the film thickness distribution was carried out by designing a film thickness correcting plate (a baffle plate) and installing it so that the long axial direction of the panel was an up and down direction, followed by film formation.

Each film thickness was, at the center portion, 14.0 nm (titanium nitride film), 5.0 nm (silicon nitride film) or 95.0 nm (silica film), and at the peripheral portion, 9.5 nm (titanium nitride film), 4.0 nm (silicon nitride film) or 115.0 nm (silica film).

The actual film formation was carried out as follows. Using an inline type sputtering apparatus, a metal titanium target for forming a titanium nitride film and a boron-doped silicon target for forming a silicon nitride film were installed in the first vacuum chamber. In the second vacuum chamber, a boron-doped silicon target for forming a silica film, was installed. The cleaned substrate glass (the panel glass) was installed in the chamber, so that the long axial direction was an up and down direction (a direction perpendicular to the advancing direction), and the entire back pressure was reduced to a level of $2\times10^{-3}$ Pa. The film thickness correcting plates were attached at positions corresponding to both sides in the long axial direction of the panel glass.

Then, in the first vacuum chamber, a mixed gas of argon and nitrogen (nitrogen being 20 vol %) was introduced as a discharge gas, and as the discharge pressure, conductance was set at $4\times10^{-1}$ Pa. Then, a negative direct current voltage (power density: about 4.0 W/cm$^2$) was applied to the titanium target, and a titanium nitride film was formed. Then, in the same atmosphere, a negative direct voltage (power density: about 1.5 W/cm$^2$) was applied to a silicon target via a pulsed module (a module to make the voltage to have a pulse wave form), and a silicon nitride film was formed. With respect to the formed titanium nitride film, the film composition was analyzed by ESCA, whereby Ti:N:O (atomic ratio) was 1.0:0.95:0.05.

Then, the substrate was transferred to the second vacuum chamber, and into the highly vacuumed chamber, a mixed gas of argon and oxygen (oxygen being about 30 vol %) was introduced and the conductance was set to be $3\times10^{-1}$ Pa. Then, a power was applied to a silicon target by means of an AC power source (power density: about 6.0 W/cm$^2$) to form a silica film (refractive index n=1.47).

The film thickness distribution of the titanium nitride film was as shown in FIG. 2. As a result, a panel glass of the present invention was prepared, whereby the overall transmittance Tgf was substantially uniform at the center and peripheral portions. The value A was 0.52. The difference between Tf(min) and Tf(max) was 9%, and Tgf(min)/Tgf(max) was 0.90.

As a comparison, a panel glass was prepared in the same manner as described above, except that film formation was carried out at a uniform film thickness without correcting the film distribution. The value A was 1. The difference between Tf(min) and Tf(max) was 0%, and Tgf(min)/Tgf(max) was 0.81.

The in-plane reflectance distribution of the panel glass of the present invention was measured at five points using the center portion of the panel glass as the origin of coordinates i.e. the origin (the center portion) and four points of x=±210 (mm) and y=±150 (mm) as the peripheral portions. At each point, the average reflectance from the film side within a wavelength range of from 450 nm to 650 nm was at most 0.5%, and the color was within a range of x=0.15 to 0.30 and y=0.15 to 0.35 by the xy coordinates stipulated by CIE, thus showing good results.

Then, the reflectance (the internal reflectance) at a wavelength of 550 nm from the glass surface side (the side opposite to the film side) was measured. The internal reflectance was 12% at the center portion and 8% at the peripheral portions, thus having no particular problem.

The measurement of the internal reflectance was carried out simply. Namely, using a float sheet glass substrate having the same size as the panel glass used in Example 1 and having a uniform thickness of 2 mm, the same surface treating film as in Example 1 was formed under the same film-forming conditions as in Example 1 on one side of the glass substrate. Then, the reflectances were measured at the center portion and the peripheral portions from the glass surface side (the side opposite to the film) of the glass substrate, and the numerical values were taken as the internal reflectances.

Further, the surface resistance was 200 Ω·☐ at the center portion of the panel, while it was 350 Ω·☐ at the peripheral positions. This is due to the fact that the film thickness of the titanium nitride film was thin at the peripheral portions. Evaluation of the resistance as the CRT was carried out by the resistance between electrodes formed on long sides of the panel glass or between the electrodes formed on the short sides. In this example, when electrodes were installed on the long sides, the resistance was bout 1700 Ω, thus showing an electrical conductivity within the practically allowable limit. However, when electrodes were installed on the short sides, the resistance was about 500 Ω, thus being excellent and free from any practical problems. Thus, it is extremely advantageous to provide a film thickness distribution of the titanium nitride film only in the long axial direction with a view to securing the electrical conductivity.

(Evaluation Relating to the Transmittance of Panel Glass)

Tg, Tf and Tgf at the center portion, the intermediate portion and the peripheral portion in the long axial direction of the obtained panel glass, were measured. The results are shown in Table 1 (comparative) and in Table 2 (present invention).

TABLE 1

(Comparative Example)

| Long axial positions | Center portion | Intermediate portion | Peripheral portion |
|---|---|---|---|
| Tint glass transmittance (Tg) | 48.84 | 46.28 | 39.52 |
| Conventional surface treating film (Tf) | 80 | 80 | 80 |
| Overall transmittance (Tgf) | 39.07 | 37.02 | 31.61 |

TABLE 2

(Example)

| Long axial positions | Center portion | Intermediate portion | Peripheral portion |
|---|---|---|---|
| Tint glass transmittance (Tg) | 48.84 | 46.28 | 39.52 |
| Surface treating film of the present invention (Tf) | 79 | 82 | 88 |
| Overall transmittance (Tgf) | 38.58 | 37.95 | 34.78 |

From the results shown in Tables 1 and 2, the following is apparent.

The transmittance distribution of a glass substrate is different by about 10% between the center portion and the peripheral portion in the long axial direction in the effective plane. When uniform film-forming is carried out by a conventional method, this transmittance distribution will be reproduced as it is as the overall transmittance distribution on a panel glass, whereby the brightness difference between the center portion and the peripheral portion can not be eliminated.

Whereas, by the control of the film thickness distribution by the present invention, the transmittance distribution as between the central portion and the peripheral portion can be suppressed to a level of at most about 4%, whereby uniform brightness can be obtained.

Further, in this example, Tg is higher at the central portion than the peripheral portion.

Example 2

This example is an example for the preparation and evaluation of a panel glass wherein a tint green glass was used as the substrate, and a transmittance distribution different from Example 1 was shown.

(Preparation of Panel Glass)

Using a substrate glass made of a tint green glass and having a predetermined transmittance difference in the short axial direction, a panel glass of the present invention is prepared in the same manner as in Example 1. However, this example, the panel glass is installed so that the short axial direction will be the up and down direction (the direction perpendicular to the advancing direction). The value A is 0.00 (precisely 0.00022). the difference between Tf(min) and Tf(max) is 8.29%, and Tgf(min)/Tgf(max) is 1.00.

As a comparison, a panel glass is prepared in the same manner as described above except that film formation was carried out with a uniform film thickness without correcting the film distribution. The value A is 1, the difference between Tf(min) and Tf(max) is 0%, and Tgf(min)/Tgf(max) is 0.89.

(Evaluation of Panel Glass)

Tg, Tf and Tgf at the center portion, the intermediate portion and the peripheral portion in the short axial direction of the obtained panel glass, are measured. The results are shown in Table 3 (Comparative) and Table 4 (present invention).

TABLE 3

(Comparative Example)

| Short axial positions | Center portion | Intermediate portion | Peripheral portion |
|---|---|---|---|
| Tint glass transmittance (Tg) | 48.70 | 50.63 | 54.58 |
| Surface treating film of the present invention (Tf) | 77 | 77 | 77 |
| Overall transmittance (Tgf) | 39.50 | 38.99 | 42.03 |

TABLE 4

(Example)

| Short axial positions | Center portion | Intermediate portion | Peripheral portion |
|---|---|---|---|
| Tint glass transmittance (Tg) | 48.70 | 50.63 | 54.58 |
| Surface treating film of the present invention (Tf) | 77 | 73.1 | 72.4 |
| Overall transmittance (Tgf) | 39.50 | 38.50 | 39.50 |

From the results shown in Tables 3 and 4, the same conclusions as in Example 1 may be led. Further, in this example, Tg is higher at the peripheral portion than the center portion.

Example 3

This example is an example wherein a tint green glass having a transmittance distribution in the direction of each of the long axis and the short axis, was used as the substrate.

(Preparation of Panel Glass)

Using a substrate glass made of a tint green glass and having a predetermined transmittance difference in the long axial and short axial directions, a panel glass of the present invention is prepared in the same manner as in Example 1.

However, in this example, a two-dimensional film thickness distribution is provided to the light-absorbing film (the titanium nitride film) on the panel glass by using a mask for correcting the film thickness distribution in a width direction, attached to the cathode side and a (punching metal) mask for correcting the film thickness distribution in the advancing direction, attached to the substrate side, in combination.

The value A was 0.65. The difference between Tf(min) and Tf(max) is 10.76%, and Tgf(min)/Tgf(max) is 0.82.

As a comparison, a panel glass is prepared in the same manner as described above except that film forming is carried out with a uniform film thickness without correcting the film distribution. The value A is 1. The difference between Tf(min) and Tf(max) is 0%, and Tgf(min)/Tgf (max) is 0.72.

(Evaluation of Panel Glass)

Tg, Tf and Tgf at the center portion, the intermediate portion and the peripheral portion in the long axial direction and in the short axial direction of the obtained panel glass, are measured. The results are shown in Tables 5 to 7 (Comparative) and Tables 8 to 10 (the present invention). In the Tables, the vertical direction represents the long axial direction, and the horizontal direction represents the short axial direction, and the same applies hereinafter. For example, in Table 5, the value of the center portion in the long axial direction or the intermediate portion in the short axial direction is 46.85.

It is apparent from Table 7 that with the panel glass of "Comparative", the difference in transmittance at the maximum of about 11% will form between the center portion and the peripheral portion, and such a panel glass is not useful as a CRT. On the other hand, it is evident from Table 10 that the in-plane distribution of the panel glass of the present invention is improved to a maximum of 7%, whereby a uniform brightness can be obtained.

TABLE 5

(Comparative Example)

| Tint glass transmittance (Tg) | Center portion | Intermediate portion | Peripheral portion |
| --- | --- | --- | --- |
| Center portion | 48.39 | 47.73 | 41.82 |
| Intermediate portion | 46.85 | 46.42 | 41.89 |
| Peripheral portion | 41.46 | 41.45 | 34.72 |

TABLE 6

(Comparative Example)

| Conventional surface treating film (Tf) | Center portion | Intermediate portion | Peripheral portion |
| --- | --- | --- | --- |
| Center portion | 80.00 | 80.00 | 80.00 |
| Intermediate portion | 80.00 | 80.00 | 80.00 |
| Peripheral portion | 80.00 | 80.00 | 80.00 |

TABLE 7

(Comparative Example)

| Overall transmittance distribution (Tgf) | Center portion | Intermediate portion | Peripheral portion |
| --- | --- | --- | --- |
| Center portion | 38.71 | 38.18 | 33.46 |
| Intermediate portion | 37.48 | 37.13 | 33.51 |
| Peripheral portion | 33.17 | 33.16 | 27.78 |

TABLE 8

(Example)

| Tint glass transmittance (Tg) | Center portion | Intermediate portion | Peripheral portion |
| --- | --- | --- | --- |
| Center portion | 48.39 | 47.73 | 41.82 |
| Intermediate portion | 46.85 | 46.42 | 41.89 |
| Peripheral portion | 41.46 | 41.45 | 34.72 |

TABLE 9

(Example)

| Surface treating film of the present invention (Tf) | Center portion | Intermediate portion | Peripheral portion |
| --- | --- | --- | --- |
| Center portion | 78.53 | 79.61 | 88.47 |
| Intermediate portion | 78.98 | 79.71 | 85.94 |
| Peripheral portion | 86.83 | 82.02 | 89.28 |

TABLE 10

(Example)

| Overall transmittance distribution (Tgf) | Center portion | Intermediate portion | Peripheral portion |
| --- | --- | --- | --- |
| Center portion | 38.00 | 38.00 | 37.00 |
| Intermediate portion | 37.00 | 37.00 | 36.00 |
| Peripheral portion | 36.00 | 34.00 | 31.00 |

From the results shown in Tables 5 to 10, it is evident that the panel glass of the present invention shows a more uniform transmittance.

Example 4

This is an example wherein a substrate glass of a semi-clear green having the same shape as in Example 1, was used.

(Preparation of Panel Glass)

A panel glass of the present invention was prepared in the same manner as in Example 1 except that a substrate glass made of semi-clear green glass, was employed. The value A was 0.24. the difference between Tf(min) and Tf(max) was 3%, and Tgf(min)/Tgf(max) was 0.98.

As a comparison, a panel glass was prepared in the same manner as described above except that film forming was carried out with a uniform film thickness without correcting the film thickness distribution. The value A was 1. The difference between Tf(min) and Tf(max) was 0%, and Tgf (min)/Tgf(max) was 0.93.

(Evaluation of Panel Glass)

Tg, Tf and Tgf at the center portion, the intermediate portion and the peripheral portion in the long axial direction of the obtained panel glass, were measured. The results are shown in Table 11 (Comparative) and Table 12 (the present invention).

TABLE 11

| (Comparative Example) | | | |
|---|---|---|---|
| | Center portion | Intermediate portion | Peripheral portion |
| Semi-clear glass transmittance (Tg) | 76.63 | 75.22 | 71.25 |
| Conventional surface treating film (Tf) | 52 | 52 | 52 |
| Overall transmittance (Tgf) | 39.85 | 39.11 | 37.05 |

TABLE 12

| (Example) | | | |
|---|---|---|---|
| | Center portion | Intermediate portion | Peripheral portion |
| Semi-clear glass transmittance (Tg) | 76.63 | 75.22 | 71.25 |
| Surface treating film of the present invention (Tf) | 52 | 53 | 55 |
| Overall transmittance (Tgf) | 39.85 | 38.87 | 39.19 |

From the results shown in Tables 11 and 12, it is evident that the panel glass of the present invention shows a more uniform transmittance.

Example 5

Using the panel glass of "Comparative" prepared in Example 1, an image was projected by a real CRT, whereby an image having uniform brightness was not obtained.

On the other hand, the reflectance from the glass surface of the glass panel of the present invention prepared in Example 1, was measured and found to be about 7%, and an image was projected by a real CRT, whereby an image of a uniform brightness was seen with a good contrast, whereby a double image was suppressed. Further, reading out was possible in an application for CAD•CAM, whereby a highly fine image is required.

INDUSTRIAL APPLICABILITY

With the panel glass of the present invention, even if it is a flattened panel glass, an image having a uniform brightness is seen with a good contrast. According to the present invention, it is also possible to provide a panel glass having an electromagnetic shielding performance or a low reflection performance. Further, it is possible to provide a panel glass having formation of a double image suppressed. Further, according to the present invention, a panel glass having the above described various characteristics, can be obtained at a low cost by a simple method.

Further, the CRT of the present invention is provided with a panel glass having the above-mentioned excellent properties, whereby an image having a uniform brightness can be seen likewise with a good contrast. Further, it is possible to obtain a CRT having an electromagnetic shielding performance or a low reflection performance. Further, it is possible to obtain a CRT having formation of a double image suppressed.

What is claimed is:

1. A CRT panel glass comprising:

a substrate glass; and a surface treating film formed on an outer surface of the substrate glass, wherein the surface treating film is formed on the outer surface so that a value A defined by the following mathematical expression is less than 1 within an effective picture plane:

$$Value\ A = \left| \frac{1 - \frac{Tgf(\min)}{Tgf(\max)}}{1 - \frac{Tg(\min)}{Tg(\max)}} \right|$$

where:
Tg(min) and Tg(max) represent a minimum transmittance (%) and a maximum transmittance (%) of the substrate glass, respectively, and
Tgf(max) and Tgf(min) represent a maximum transmittance (%) and a minimum transmittance (%) of an integral body comprising the substrate glass and the surface treating film.

2. The CRT panel glass according to claim 1, wherein a difference between a minimum transmittance Tf(min) of the surface treating film and a maximum transmittance Tf(max) of the surface treating film is within a range of from 2 to 20%.

3. The CRT panel glass according to claim 1, wherein Tgf(min)/Tgf(max) is at least 0.8.

4. The CRT panel glass according to claim 1, wherein the surface treating film is an antireflection film against outer light.

5. The CRT panel glass according to claim 1, wherein said Tg(max) is within a range of from 30 to 70%.

6. The CRT panel glass according to claim 1, wherein a reflectance as observed from inside of the substrate glass is at most 15%.

7. The CRT panel glass according to claim 1, wherein the surface treating film is a film having a construction such that a light absorbing layer containing titanium nitride as a main component and a layer containing silica as a main component are formed in this order on the substrate glass.

8. The CRT panel glass according to claim 7, wherein the light absorbing layer containing titanium nitride as the main component, has a film thickness distribution.

9. The CRT panel glass according to claim 8, wherein the layer containing silica as the main component, has a film thickness distribution reverse to the light absorbing layer containing titanium nitride as the main component.

10. The CRT panel glass according to claim 1, wherein said Tgf(max) is within a range of from 30 to 70%.

11. The CRT panel glass according to claim 1, wherein a transmittance Tf at an optional position of the surface treating film is within a range of from 40 to 90%.

12. The CRT panel glass according to claim 1, wherein an outer diameter of the CRT panel glass is at least 5 times a value R calculated by the following mathematical expression:

Value R (unit: mm)=Screen diagonal length (inch)×42.5+45.0

13. A method for producing a CRT panel glass comprising:

forming a surface treating film on an outer surface of a substrate glass, such that a value A defined by the following mathematical expression is less than I within an effective picture plane:

$$\text{Value } A = \left| \frac{1 - \frac{Tgf(\min)}{Tgf(\max)}}{1 - \frac{Tg(\min)}{Tg(\max)}} \right|$$

where:

Tg(min) and Tg(max) represent a minimum transmittance (%) and a maximum transmittance (%) of the substrate glass, respectively, and Tgf(max) and Tgf(min) represent a maximum transmittance (%) and a minimum transmittance (%) of an integral body comprising the substrate glass and the surface treating film.

14. A CRT having the CRT panel glass as defined in claim 1.

* * * * *